Patented Dec. 26, 1944

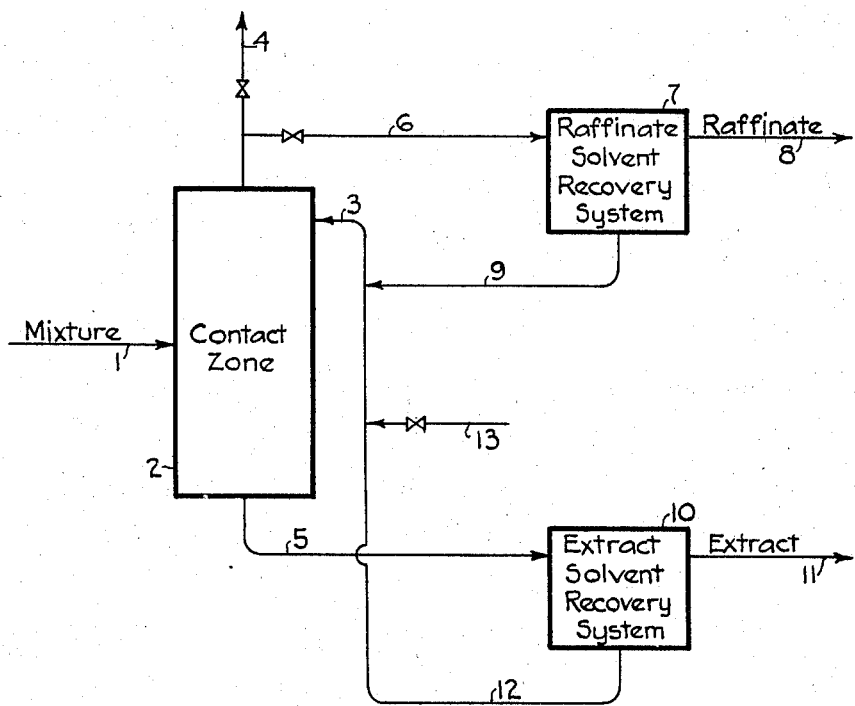

2,365,898

UNITED STATES PATENT OFFICE 2,365,898

SOLVENT EXTRACTION PROCESS

Rupert C. Morris and Norten C. Melchior, Berkeley, Calif., assignors to Shell Development Company, San Francisco, Calif., a corporation of Delaware Application October 19, 1943, Serial No. 506,918

17 Claims. (Cl. 196—13)

This invention relates to a process for separating mixtures of different compounds by extraction with a selective solvent which comprises an organic sulfoxide of the general formula

wherein $R_1$ and $R_2$ are organic radicals such as aliphatic, alicyclic, aromatic or mixed hydrocarbon radicals or organic radicals containing a polar grouping, specifically oxygen, sulfur, nitrogen, halide, and/or possibly allied atoms. $R_1$ and $R_2$ may be joined together to form a heterocyclic ring such as a tetrahydro- and dihydro-1-thiophene oxide and their derivatives wherein one or more of the hydrogen atoms on the ring may be replaced by an organic radical of any of the types just mentioned above.

The sulfoxides of this invention have the advantage over many of the now commercially employed solvents such as sulfur dioxide, furfural, phenol, naphthol, benzene, aniline, nitrobenzene, etc., in that they are generally more stable and more chemically inert. For example, sulfur dioxide, phenol and others will react with diolefins; aniline will react with acids; nitrobenzene will react with mercaptans; and furfural will polymerize or decompose in the presence of mere traces of acids or bases. In contrast, the sulfoxides are unreactive in all of the above cases.

It is the broad purpose of this invention to separate mixtures of different compounds economically, efficiently and effectively by solvent extraction. Specific purposes are, among others, to produce pure compounds, desulfurize and increase the viscosity index of hydrocarbon mixtures, dehydrate wet compounds, separate components of constant boiling mixtures or of mixtures having boiling points closer than, say, 10° C., or of isomeric mixtures, or mixtures of similar organic compounds having different degrees of saturation, or of other mixtures otherwise difficultly separable.

Generally, the process of this invention comprises the steps of (A) contacting the mixture to be separated either in the liquid or the vapor state with a liquid selective solvent to produce a raffinate phase and an extract phase, (B) separating the two phases from each other, and (C) removing the solvent from at least one of said phases to produce a raffinate and/or an extract and, usually, also recovering the solvent removed for further contact with more of said mixture. These steps, common to all solvent extraction processes, both liquid-liquid and vapor-liquid (including extractive distillation), may be carried out in any suitable manner known to those skilled in the art.

Many different types of mixtures of compounds may be separated by the selective solvents of this invention, provided the mixtures are inert toward the solvent, and the presence of the solvent in the mixture causes a greater change in the "escaping tendency" of one component of the mixture relative to that of other components. By "escaping tendency" is meant the potential of one component to pass from one phase to another. Thus the selective solvents of this invention are effective for the isolation of pure compounds, the separation of isomers, various purification processes, such as desulfurization and dehydration, the separation of mixtures forming azeotropes, or the separation of mixtures of organic compounds of different degrees of saturation, for instance, to concentrate different types of hydrocarbons in different fractions, examples being the separation of aromatics, polyolefins, olefins, naphthenes, and paraffins from various hydrocarbon mixtures containing them.

Some specific examples of mixtures which may contain part or all of the components listed below and which may be separated from one another by the selective solvents of this invention are hydrocarbon mixtures such as ethane and ethylene; propane and propylene; butanes, butylenes, butadiene, vinyl acetylene and ethyl acetylene; pentanes, pentenes, isoprene and piperylene, $C_5$ acetylenes; hexanes, hexenes and hexadienes; gasoline distillates containing benzene, toluene, xylenes, ethyl benzene, mesitylene, cumene, etc.; ortho- and para-xylene; naphthenes and paraffins; gasoline, kerosene, fuel oils, lubricating oils, etc.; halogenated hydrocarbons including ortho and para chloronitrobenzene; etc. Other mixtures which may be separated are those of organic substances containing water, such as aqueous alcohols including methyl, ethyl, propyl, etc., alcohols; glycols; glycerines; chlorhydrins; organic acids including acetic, propionic, lactic, etc. acids; esters including isopropyl acetate; etc. Still other mixtures are those of oxy organic compounds such as ortho and para nitrophenol; ortho and para methoxy phenol; ortho and para dihydroxy benzene; glycol chlorhydrin and glycol; glycol and glycol ethers; ethyl acetate and ethyl alcohol; nitroglycerine and glycerine; primary and secondary butyl alcohols; alkyl phenols such as ortho, meta and para cresols; ortho and para-hydroxy benzaldehyde; ortho and para ethoxy aniline; ortho and paravanillin; methyl propyl ketone and diethyl ketone; mixtures of resorcin, pyrocatechine and hydroquinone; terpenes or sesquiterpenes from oxygen-containing compounds such as alcohols or aldehydes present therein; etc. Other organic mixtures are those produced in various chemical industrial processes of the coal, lignite and petroleum industries such as organic sulfur compounds including mercaptans, mixtures of phenols and thiophenols; mixtures of nitrogen bases from each other and from other organic compounds including petroleum; essential oils; fatty oils including glyceride oils, such as linseed, soya bean, fish, perilla, cottonseed, etc.; mono-, di- and tri-methylamines; isoprene and methyl formate; isophorone and xylidene, isophorone and xylenol; organic acids such as methyl succinic acid and glutaric acid; various fatty acids including stearic, oleic, linoleic, etc. acids; tall oils; rosins and various synthetic resins; propane-1,1-dicarboxylic acid and propane-1,3-dicarboxylic acid; ortho and para cetyl benzol sulfonic acid; etc.

It may be noted that all the above mixtures are of a type which are at least partially soluble in the commonly known selective solvents and have preferential solvent power for aromatic over paraffinic hydrocarbons.

The sulfoxides of this invention may be employed as selective solvents by themselves singly or as mixtures of two or more; or in aqueous solutions; or together with auxiliary commonly known selective solvents or anti-solvents, provided they do not react with the particular sulfoxide employed and are stable under the temperature conditions of the process.

Some suitable specific sulfoxides of the general formula

wherein the $R_1$ and $R_2$ are organic radicals which are not linked together, are the hydrocarbon substituted sulfoxides such as: dialkyl, dialkenyl, alkyl alkenyl, dialicyclic, alkyl alicyclic, alkenyl alicyclic, diaryl, alkyl aryl, alkenyl aryl, and alicyclic aryl sulfoxides.

Some cyclic sulfoxides wherein the $R_1$ and $R_2$ of the above general formula are linked together to form a heterocyclic ring are tetra-hydro-thiophene oxides (commonly called cyclotetramethylene sulfoxide):

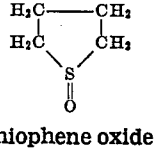

and a dihydro-1-thiophene oxide:

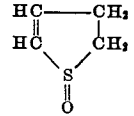

and their homologues wherein any one or more of their hydrogen atoms is replaced by a hydrocarbon radical such as any one of those above mentioned.

Suitable sulfoxides may contain polar organic radicals which are derivatives of any one of the above mentioned hydrocarbon substituted sulfoxides, wherein one or more of the hydrogen atoms may be substituted with a radical containing an oxygen, sulfur, nitrogen, phosphorous halide, etc. The sulfoxide derivatives containing oxygen include alcohols, ethers, ketones, acids and esters. For example, derivatives containing oxygen include: $R_1$—SO—$R_2$—O—$R_3$, wherein $R_1$, $R_2$ and $R_3$ may be any aliphatic hydrocarbon radical. The derivatives containing sulfur include hydrosulfides, disulfides and sulfides. Other sulfoxide derivatives may contain nitrogen as in amine radicals, halogen esters of inorganic acids, or mixed radicals of any of these so far mentioned.

Sulfoxides may be made by oxidizing their corresponding sulfides and then subjecting the resulting product to alkylation, hydration, amination, halogenation, or other substitution and/or addition reactions.

Sulfoxides employed for solvent extraction should in general contain not more than 14 carbon atoms per molecule and preferably between 2 and 8 inclusive. To meet stability requirements, they should not contain more than one olefinic double bond. A preferred group comprises dialkyl sulfoxides of not more than 8 carbon atoms because of their stability and simplicity of manufacture.

Generally, suitable sulfoxides should not crystallize out of solution at the highest concentration which may occur at any point in the process or at a temperature above about 150° C. It is therefore desirable that they melt at a temperature not higher than 150° C. and preferably below 100° C., and it is further desirable that they be not more than 50% by weight soluble at room temperature in kerosene having a Watson characterization factor of at least 12 (see Industrial and Engineering Chemistry, vol. 27, page 1460, December, 1935, "Characterizations of petroleum fractions," by K. M. Watson, E. F. Nelson and George B. Murphy). Higher solubility in such a kerosene frequently is an indication of poor selectivity.

Of the sulfoxides useful in this invention some are more heat stable than others. In particular the halogen, carboxyl derivatives as well as some esters are relatively heat unstable. Some may begin to decompose at temperatures as low as 150° C. Other sulfoxides on the other hand are extremely heat stable even at temperatures as high as 300° C.

The sulfoxides may be employed in conjunction with many commonly known solvents, selective solvents and/or modifying agents to improve their selectivity, solubility and stability, to lower their boiling temperature, etc. Some such solvents and agents are: water, various mono- and polyhydric alcohols such as methanol, ethanol, propanol, furfuryl alcohol, benzyl alcohol, glycols, glycerols, etc.; various ketones such as acetone, methyl ethyl ketone, diethyl ketone, methyl-isobutyl ketone, cyclopentanone, benzophenone, phenyl tolyl ketone, diphenylene ketone, etc.; various aldehydes such as benzaldehyde, furfural, etc.; ethers such as ethylene glycol and diethylene glycol mono-alkyl ethers, mono- and di-glyceryl ethers, glyceryl diethers, chlorinated dialkyl ethers (e. g., beta-beta-dichlorethyl ether), dioxane, etc.; lower aliphatic acids such as acetic, propionic acids, acetic anhydride, etc.; esters such as benzoic or phthalic acid esters, methyl acetate, ethyl acetate, etc.; phenol, cresylic acids, alkyl phenol mixtures, naphthols, alkyl naphthols, etc.; liquid ammonia, various organic amines such as lower aliphatic primary amines having one to eight carbon atoms, aniline, alkyl anilines, morpholine, diphenyl amine, ditolylamine, etc.; various nitriles such as acetonitrile, propionitrile, lactonitrile, butyronitrile, benzonitrile, etc.; various nitro hydrocarbons such as nitromethane, nitroethane, nitrobenzene, nitrotoluene, nitroxylenes, etc.; various pyridines and quinolines; liquid sulfur dioxide; various aromatic hydrocarbons such as benzene, toluene, naphthalene, etc.; sulfolane and various substituted sulfolanes; various modifying salts such as those disclosed in U. S. Patent 2,246,257 to Kohn; and the like.

The sulfoxide or the mixture of sulfoxide with an auxiliary solvent must be at least partially miscible with the mixture to be separated under the conditions of the process.

Furthermore, anti-solvents may be employed together with the sulfoxides such as are employed in the DuoSol process for the extraction of lubricating oils. Some such anti-solvents include propane, butanes, pentanes, n-hexane; paraffinic gasoline, kerosene, gas oil, lubricating oil, various ethers, tri-chlorethylene, carbon tetrachloride, etc. Still further, compounds of two or more solvents together with one or more anti-solvents may also be employed.

The amount of auxiliary or anti-solvents which may be employed in conjunction with the sulfoxides to make up the solvent may range up to 90% by volume, preferably less than 50% by volume, of the solvent.

In determining whether a liquid-liquid or vapor-liquid extraction should be employed in any given case, both the natures of the mixture to be separated and of the sulfoxide must be considered. As to the mixtures, those having high viscosities and high boiling temperatures, or those chemically or physically unstable at high temperatures, or those which react with the solvent at high temperatures, should be extracted while in the liquid state. As to the sulfoxides, those containing polar substitution radicals are in general less heat-stable than the hydrocarbon sulfoxides. Therefore, it is preferable in general to employ the former in low temperature extraction processes only.

In liquid-liquid solvent extraction the temperature generally may range within wide limits, provided it is above the melting temperature of the solvent and below the boiling temperature of both the mixture and the solvent under the pressure conditions of operation of the process. For example, if a very volatile mixture is being separated, a relatively high pressure and/or low temperature are required, while if a very viscous and high boiling mixture is being separated, higher temperature and lower pressure are normally more advantageous. Thus, the temperature may range between about −50° C. and about +300° C. and the pressure between about atmospheric and 500 p. s. i.

In vapor-liquid solvent extraction such as extractive distillation the general temperature range, though wide, is higher for the same mixtures than in liquid-liquid extraction. It is above the bubble temperature of the mixture and below the boiling temperature of the solvent under the pressure maintained in the process. If a normally gaseous mixture is separated by extractive distillation, a relatively low temperature may be employed, while if a normally liquid mixture is separated by the same process a higher temperature is usually required. Subatmospheric pressure may be resorted to in order to reduce the extraction temperature if the mixture is thermally unstable at higher temperatures. Suitable temperatures may range from above about −50° C. or the bubble temperature of the mixture (whichever is higher), up to about +350° C., at pressures from about ¼ inch of mercury up to about 500 lbs. p. s. i. or higher.

Useful solvent-to-mixture ratios may range from about ½ to 20 by volume, preferably not more than 10.

The accompanying drawing is a general flow diagram of a solvent extraction process.

A mixture to be separated is introduced in either the liquid or the vapor state through line 1 into contact zone 2 and admixed with a sulfoxide introduced into the same zone through a separate line 3. This is the first step in all solvent extraction processes and may comprise either a bubble plate mixer, an impinging jet mixer, an agitation vessel, a plate column, or a packed tower.

In the contacting zone the mixture and sulfoxide are caused to produce a raffinate phase and an extract phase which are separately withdrawn respectively through lines 4 and 5. This is the second step of all solvent extraction processes, namely, the separation of two phases produced in the contacting zone, and may be effected by distillation, settling, decantation, or centrifuging.

The third step (common to all solvent extraction processes) comprises the recovery of sulfoxide from one or both phases. In vapor-liquid extraction processes the raffinate phase may be substantially free of sulfoxide and may be withdrawn directly through line 4; but if enough solvent is present to warrant its recovery the raffinate phase is passed through line 6 into the raffinate solvent recovery system 7 to produce a solvent-free raffinate, which is withdrawn through line 8, and recovered sulfoxide which is withdrawn through line 9 and preferably joined to line 3 of sulfoxide entering contact zone 2. This recovery system may comprise a crystallization chamber, distillation column, or a washing column. If the sulfoxide is washed from the raffinate phase an additional step for its recovery is necessary, such as distillation, to separate the sulfoxide from the wash solvent.

The extract phase is introduced into a solvent recovery system 10, which is similar to recovery system 7. From recovery system 10 a solvent-free extract is withdrawn through line 11 and the recovered sulfoxide is withdrawn through line 12 and joined to line 3 for recontact with more of the mixture in contact zone 2. Fresh sulfoxide may be added to the system from time to time through line 13 as required.

*Example I*

A petroleum distillate having a boiling range of between 90 and 115° C. and containing 4.98% weight of mercaptans calculated as amyl mercaptan was admixed at room temperature with an equal volume of diethyl sulfoxide. Two liquid phases were produced which were separated and analyzed for mercaptans. The raffinate phase contained 1.36% weight mercaptans, 27.3% of the total mercaptans. In the extract phase was found 3.52% weight mercaptans, which represented 70.7% of the total mercaptans originally present.

*Example II*

A sample of a mixture of 4 parts benzene and 6 parts by volume of cyclohexane having a refractive index of 1.4164 was admixed with an equal volume of diethyl sulfoxide. Two liquid phases were formed. Each phase was separated from the solvent and then the refractive index was determined. The raffinate phase had a R. I. of 1.3882 and contained 26.2% by volume of the total benzene and the extract phase had a R. I. of 1.4430 and contained 73.8% of the total benzene.

*Example III*

A 50–50 mixture of toluene (boiling point 110.6° C.) and paraffins having about the same boiling range as toluene was admixed in a vessel with an equal weight of diethyl sulfoxide. The mixture was then heated until the vapor above the liquid was in equilibrium with the liquid, and a sample of the vapor was separated and condensed. The diethyl sulfoxide was then removed from the resulting liquid and condensate by water washing and the sulfoxide free fractions were found to contain 38.1% and 56.7% toluene, respectively. From this data the volatility ratio of toluene to paraffin in the presence of diethyl sulfoxide was calculated to be 2.18, while the volatility ratio of the same mixture of toluene and paraffins alone (i. e., in the absence of any solvent) was 1.35. The volatility ratio, often called the alpha value, is the ratio of the percent of paraffins in the vapor to the percent of paraffins in the liquid, divided by the ratio of the percent of toluene in the vapor to the percent of toluene in the liquid.

We claim as our invention:

1. In a solvent extraction process for separating a mixture of different organic compounds the steps comprising contacting said mixture with a liquid sulfoxide which is stable at the temperature of contacting to produce a raffinate and an extract and separating said raffinate and extract.

2. The process of claim 1 wherein said sulfoxide has the general formula

wherein $R_1$ and $R_2$ are selected from the group consisting of (1) alkyl, alkenyl, alicyclic, aryl and a mixed radical; (2) a heterocyclic ring formed by joining them and (3) the derivatives of (1) and (2) containing atoms selected from the group consisting of oxygen, sulfur and nitrogen.

3. The process of claim 1 wherein the mixture comprises predominantly hydrocarbons.

4. The process of claim 1 wherein the mixture consists of hydrocarbons of different degrees of saturation.

5. The process of claim 1 wherein said sulfoxide contains less than 14 carbon atoms per molecule.

6. The process of claim 1 wherein said sulfoxide contains between 2 and 8 carbon atoms per molecule inclusive.

7. The process of claim 1 wherein said sulfoxide is dipropyl sulfoxide.

8. The process of claim 1 wherein said sulfoxide is diethyl sulfoxide.

9. In a solvent extraction process for separating a mixture of different organic compounds the steps comprising contacting said mixture with a sulfoxide which is stable at the temperature of contacting and has the general formula

wherein $R_1$ and $R_2$ are selected from the group consisting of (1) alkyl, alkenyl, alicyclic, aryl and a mixed radical; (2) a heterocyclic ring formed by joining them; and (3) the derivatives of (1) and (2) containing atoms selected from the group consisting of oxygen, sulfur and nitrogen, to produce a raffinate and an extract, separating said raffinate and extract, recovering said sulfoxide and returning the recovered sulfoxide for further contact with more of said mixture.

10. In a solvent extraction process for separating a mixture of organic compounds, the steps comprising contacting said mixture with a selective solvent to produce two phases, and separating said phase, said selective solvent comprising not less than 10% by volume of a sulfoxide which is stable at the temperature of contacting and which at room temperature is less than 50% by weight soluble in kerosene having a Watson characterization factor of at least 12.

11. The process of claim 10 wherein the solvent comprises more than 50% by volume of said sulfoxide.

12. The process of claim 10 wherein the solvent-mixture ratio ranges between ½ and 20 by volume.

13. In a solvent extraction process for the separation of a liquid mixture of different organic compounds the steps comprising contacting said mixture with a liquid sulfoxide which is stable at the temperature of contacting and which at room temperature is less than 50% by weight soluble in kerosene having a Watson characterization factor of at least 12, at a temperature below the boiling temperatures of said mixture and said solvent, to produce two phases, and separating said phases.

14. In a solvent extraction process for separating a vaporizable liquid mixture of organic compounds the steps comprising contacting said mixture with a sulfoxide which has a higher boiling temperature than said mixture which is stable at the temperature of contacting and which at room temperature is less than 50% by weight soluble in kerosene having a Watson characterization factor of at least 12, at a temperature below the boiling temperature of said sulfoxide and above the bubble temperatures of the mixture and said sulfoxide, to produce two phases, separating said phases and recovering said sulfoxide from at least one of said phases.

15. The process of claim 1 wherein said mixture comprises aromatic and non-aromatic compounds.

16. The process of claim 1 wherein said mixture comprises olefins and diolefins.

17. In a process for desulfurizing petroleum hydrocarbons containing organic sulfur compounds, the steps comprising contacting said hydrocarbons with a liquid sulfoxide which is stable at the temperature of contacting to produce two phases, one being richer in sulfur containing compounds than the other, and separating said phases.

RUPERT C. MORRIS.
NORTEN C. MELCHIOR.